United States Patent [19]

Smith

[11] Patent Number: 5,581,736
[45] Date of Patent: Dec. 3, 1996

[54] METHOD AND SYSTEM FOR DYNAMICALLY SHARING RAM BETWEEN VIRTUAL MEMORY AND DISK CACHE

[75] Inventor: Brian J. Smith, Seattle, Wash.

[73] Assignee: Microsoft Corporation, Redmond, Wash.

[21] Appl. No.: 276,269

[22] Filed: Jul. 18, 1994

[51] Int. Cl.$^6$ ................................................. G06F 12/08
[52] U.S. Cl. ....................... 395/497.01; 395/440; 395/463
[58] Field of Search ............................. 364/200 MS File, 364/900 MS File; 395/440, 497.01–497.04, 600, 463

[56] References Cited

U.S. PATENT DOCUMENTS

| | | | |
|---|---|---|---|
| 4,463,424 | 7/1984 | Mattson et al. | 395/463 |
| 4,503,501 | 3/1985 | Coulson et al. | 395/456 |
| 5,307,473 | 4/1994 | Tsuboi et al. | 395/470 |
| 5,345,584 | 9/1994 | Hill | 395/600 |
| 5,420,998 | 5/1995 | Horning | 395/440 |
| 5,434,992 | 7/1995 | Mattson | 395/446 |

OTHER PUBLICATIONS

Apiki, *Massive Storage for Multiple Platforms*, BYTE, v15, n12, p. 172, Nov. 1990.
*New Release of TI System V Combines Data Integrity with Improved Performance*, New Release, Nov. 15, 1991, p. 1.
*New Software DASD–Cashing Capabilities for VM Users*, News Release, Oct. 1, 1986, p. 11.
Nelson et al., *Doing the Right Thing: Mass Storage*, Network Computing, Sep. 1992, p. 95.
Taft, *Unix Expo touts new RS/6000s, USL's Tuxedo*, Computer Reseller News, Sep. 21, 1992, p. 10.
Smith, *On your mark, get set, VROOM!*, Data Based Advior, V8, n11, p. 40(6), Nov. 1990.

Rosch, *Multitasking without OS–2*, PC Magazine, v8, n10, May 30, 1989, p. 329(9).
Mace, *Ashton–Tate ships 'bug free 'Dbase 1.1*, InfoWorld, v12, n32, p. 13(1), Aug. 6, 1990.
Bowen, *Freeing the I/O logjam with limited investment*, Digital Review, v7, n39, p. 35(3), Oct. 8, 1990.
Lawrence, *High availability disk battle begins*, IBM System User, v13, n6, p. 58(1), Jun. 1992.
Lindholm, *Closing the performance gap: as RAID systems mature, vendors are tinkering with the architecture to increase performance*, Datamation, v39, n5, p. 122(5), Mar. 1, 1993.
Brooks, *Storage selection*, DEC Professional, v10, n9, p. 28(1), Sep. 1991.
Brenesal, *Updated Power Pak deftly distributes Windows memory*, PC–Computing, v4, n6, p. 82(2), Jun., 1991.
Mendelson, PC Magazine, v8, n21, p. 171(1), Dec. 12, 1989.

*Primary Examiner*—Matthew M. Kim
*Attorney, Agent, or Firm*—Jones & Askew

[57] ABSTRACT

In a computer system having a processing unit, a primary memory space (RAM) and a secondary memory space (disk), the primary memory space being allocated between a virtual memory portion and a disk cache portion, a method of dynamically adjusting the allocation of the primary memory space. The number of times that the processing unit accesses the secondary memory space in a predetermined time period is measured. Next, it is determined whether an adjustment to the allocation of the primary memory space would reduce the number of times that the secondary memory space is accessed by the processing unit. If it is determined that an adjustment to the allocation of the primary memory space would reduce the number of times that the secondary memory space is accessed by the processing unit, then the allocation of the primary memory space will be adjusted by increasing the portion allocated to either virtual memory or disk cache, and decreasing the portion allocated to the other.

19 Claims, 5 Drawing Sheets

Fig. 1

METHOD AND SYSTEM FOR DYNAMICALLY SHARING RAM BETWEEN VIRTUAL MEMORY AND DISK CACHE

TECHNICAL FIELD

The present invention relates generally to computer systems, and more particularly relates to an improved method of allocating RAM between virtual memory and disk cache memory.

BACKGROUND OF THE INVENTION

Traditionally, computer memories were divided into two categories: read-only memory (ROM) and random-access memory (RAM). ROM is the semi-conductor based memory that contains information that can be read by the microprocessor or other hardware devices but not modified. ROM is generally used to store programs for the computer or instructions that the computer needs in order to perform essential tasks. For example, in IBM-compatible computers, the built-in instructions that form the basic input-output system (BIOS) are stored in ROM.

RAM, on the other hand, is generally volatile memory, i.e., it can be read and written by the microprocessor or other hardware devices. A portion of RAM is used to hold the operating system and the programs and files that the user is actively working with. Other portions of RAM are reserved for the system's own use, including the instructions which access the ROM BIOS chips. The term RAM is often used synonymously with the terms "physical memory" or "primary memory" to refer to the memory actually present in a computer system.

The important functional characteristic of RAM is the ability to randomly access any part of the memory in equal time. That is, the time required to obtain information from one memory location is generally the same as that required to obtain it from any other.

Because the amount of RAM in a computer is limited, "secondary storage" devices such as magnetic tapes and hard disks developed in order to store larger amounts of data. In contrast to RAM, the storage area in a secondary storage device is not directly accessible by the processor. Instead, the storage area is accessible only by input/output (I/O) operations, which is much slower than the time required to directly access data in RAM. Furthermore, although data may reside in a secondary storage device, it can be processed only when it resides in RAM.

Because the processor can access RAM directly and very quickly, it would be desirable to store all of the computer's data in RAM. Unfortunately, there is a finite amount of space in RAM, and computers often do not have enough RAM to hold everything that is needed. Some older computers have as little as 640K of RAM, or even less, and are therefore unable to hold many large programs and files. Even modem computers that have as much as 256 MB of RAM often do not have the capacity to hold several different application programs at one time in addition to some of the data that is related to those programs.

An obvious solution to this dilemma would be to simply add more and more RAM to the computer. Generally speaking, the more RAM a computer has, the more information and data it can actively work with at one time. RAM, however, is a fairly expensive commodity, and therefore it is not always economically feasible to expand the amount of RAM in a computer. Furthermore, due to hardware constraints, there is always a practical limit to the amount of RAM a computer can use or address.

As software technologies improved, yet another type of storage developed known as "virtual memory". In general, virtual memory provides the illusion that there is a greater amount of RAM than is actually installed in the computer by treating part of a secondary storage device, such as a hard disk, as if it were also RAM. The same part of the computer's operating system that puts programs and data into RAM treats the virtual memory portion of the secondary storage device exactly as if it were RAM.

More specifically, virtual memory extends the amount of memory that the operating system is capable of addressing to take into account the total amount of memory—actual and virtual—available to the system. As is well known to those skilled in the art, the number of addressable words accessible by a computer depends on the number of bits in its address field and is unrelated to the number of memory words actually available. For example, a hypothetical computer having a 16-bit address field can theoretically address 65,536 (64K) words of memory. However, if only 4096 (4K) words of RAM are provided, the addressing capability of the computer is not being fully exploited.

As used herein, the term "address space" represents the number of words a particular computer can address utilizing all bits of the address field provided in the computer architecture. In the hypothetical 16-bit computer referenced above, the address space comprises the numbers 0, 1, 2, . . . 65,535, the set of possible addresses.

In virtual memory, applications access memory through virtual addresses, which are mapped by special hardware onto physical addresses, by translating addresses in the address space into physical memory (RAM) locations. For example, in the hypothetical computer referenced above having 4K of physical memory (RAM), a "map" may be created for containing information which relates addresses generated in the 64K address space of the computer to addresses in the 4K physical memory (RAM). Procedures have been developed to carry out such maps, and are well known in the art.

Fundamental to the operation of virtual memory is the concept of "swapping", which is also referred to as "paging". Paging is a technique developed to provide the mapping of a larger address space to a smaller physical memory. Paging divides the virtual address space into fixed-sized blocks called "pages", each of which can be mapped onto any physical addresses available on the system. Within a computer, paging occurs when different pages of programs or data are moved between physical memory (RAM) and a secondary storage device.

In a conventional virtual memory implementation, paging occurs after a "page fault", i.e., when a program has accessed a virtual memory location that is not currently in RAM. A page that has not been recently accessed is "paged out" from RAM to the secondary storage device, and the page needed by the faulting program is "paged in." The mapping hardware is notified of the new physical address of the page, and the instruction that caused the page fault is restarted.

In the "WINDOWS" operating system, developed by Microsoft Corporation, the assignee of the present invention, virtual memory is implemented by the creation of a "paging file" on the secondary storage device. The paging file temporarily stores the pages of programs or data when they are not actively in use. Thus, when RAM gets full, the operating system can move pages of programs or data files into the paging file for temporary storage, freeing up space in RAM for new files and programs. In these systems, the term "virtual memory" is often used to refer both to the process by which data is swapped between RAM and the secondary storage device, as well as to the combination of RAM and the paging file.

Those skilled in the art will recognize that it is irrelevant whether a piece of data is stored in the virtual memory portion of RAM or in the virtual memory portion of the secondary storage device, i.e., the paging file. At any particular time, each individual page in the virtual address space might be referring to data that is in RAM or in the paging file, depending on how recently it has been used. Because a program can only directly access data that is in RAM, an application will be able to gain immediate access to any piece of data stored in RAM. On the other hand, if that piece of data is stored in the paging file, the operating system will read the data from the secondary storage device into a section of RAM. If that section of RAM is currently occupied by some other piece of data, then certain data will have to be written back to the secondary storage device.

There are many different ways that an operating system may decide which data should be swapped between RAM and the secondary storage device. The most commonly used methods involve "least recently used" algorithms. That is, the operating system keeps track of which applications and data in memory have been least recently accessed and makes them prime candidates for moving to the disk if more RAM is needed for some reason. For example, if the operating system determines that there is not enough RAM to load a particular program or other data, it relocates the least recently used information from RAM into the paging file, and then loads the requested program or data into the newly vacated space in RAM.

In addition to virtual memory, there is also a second competing use of the finite amount of RAM in a computer: disk cache. A disk cache is generally used to compensate for the slowness of disk drives. Regardless of how fast a disk drive may be, its many mechanical parts make it extremely slow to access compared to the speed of a RAM chip which moves data at the speed of electricity.

The concept behind a disk cache is to speed up the computer's operations by keeping in RAM the data that the programs are most likely to request from the disk drive. Then if a program needs that piece of data again while it is still in RAM, then the program can access that information directly from the disk cache, without having to read from the disk drive. Thus, disk cache refers to the portion of a computer's RAM set aside for temporarily holding information read from or written to a disk drive.

A disk cache operates by intercepting a data request sent from an application or the operating system to the disk drive. The disk cache reads the data from the disk drive, but in addition to the requested data, it may also retrieve more data, typically from adjacent clusters, i.e., units of space on the disk drive. The disk cache passes along the requested data to the application or operating system, but stores a copy of it, along with any excess data also retrieved, in a portion of RAM reserved for the disk cache.

During the time in which the CPU is not actively engaged in processing instructions, the disk cache may take control to read still more data from the disk drive, which the disk cache also stores in RAM, usually from clusters near the files that have already been read. Some disk caches have a built-in logic that makes intelligent guesses about which clusters are more likely to be requested later by the application. The intelligence of this logic distinguishes one disk cache's efficiency from another's.

When the application or operating system later requests more data, for example, after a page fault, the disk cache again intercepts the request and checks to see if the requested data is already stored in RAM. If it is, the disk cache supplies the data directly to the application or operating system without having to access the disk drive. Therefore, access time is considerably faster than if the program must wait for the disk drive mechanism to fetch the information from the disk.

If, on the other hand, the data is not already stored in RAM, the disk cache repeats the earlier process, retrieving the new data, supplying it to the application or operating system, and also storing it in RAM along with extra clusters from the disk drive. As the RAM used by the disk cache fills up, the disk cache releases the data that has been in the buffer the longest without being used and replaces it with data retrieved during more recent disk accesses.

When a program issues a command to save data to disk, some disk caches intercept the data and defer writing it to the disk drive until the CPU is otherwise idle. This speeds up computer operations because the CPU's attention is not divided between writing to the disk drive and other processing. If the file to be written to disk is still held in the area of RAM reserved for the disk cache, then the disk cache writes to disk only the clusters that have been changed. Some disk caches also hold pending writes and perform them in an order that minimizes the movements of the disk drive's read/write heads.

Therefore, it will be appreciated that the finite amount of RAM in a computer must be allocated between virtual memory and disk cache. On the one hand, the larger the portion of RAM allocated to the disk cache, the more data from the secondary storage device, or disk drive, that can be kept in RAM rather than on the secondary storage device, and the faster the access to that data will be. On the other hand, the larger the portion of RAM allocated to disk cache, the less RAM available for virtual memory. Thus, the operating system will have to do more paging of data between the virtual memory portion of RAM and the paging file.

At any particular time, there will be a certain allocation of RAM whereby the "performance level" of the computer system is optimized by devoting a certain amount of RAM to disk cache and a certain amount of RAM to virtual memory. The "performance level" of the computer is related to the number of times that the computer accesses the disk in a particular time period, and thus is a measure of the processing speed at which the computer is currently operating. The optimal amount of RAM to devote to either virtual memory or disk cache is determined by the size of the "working set" of the data. The term "working set" refers to the data that is currently being frequently accessed. Thus, the particular allocation of physical memory should depend on the particular operation being performed and whether or not the disk is being heavily accessed.

An improper allocation of physical memory can cause a significant slowdown in the operation of the system, i.e., a reduction in the "performance level" of the computer. For example, consider another hypothetical computer system having eight pages of RAM, five of which are set aside for virtual memory, and the other three set aside for disk cache. A program that has a "working set" of six pages of virtual memory will only be able to store a maximum of five pages in RAM at any one time. Thus, one additional page will always have to be stored in the paging file. Because the program is constantly accessing these six pages, however, the operating system will have to be constantly switching five of those six pages that are in RAM. It will be appreciated that this is a time consuming process that significantly slows down the operation of the program. Thus, performance may be significantly improved by allocating one additional page from disk cache to virtual memory such that all six pages of that working set will fit into the virtual memory portion of RAM.

On the other hand, consider a computer having three pages of RAM allocated to disk cache and running a program that is searching a database that is four pages large. In this case, only three pages of data will be able to be stored in disk cache at any one time. Therefore, the database will be required to repeatedly access the secondary storage device in order to do repeated searches, causing a significant slowdown in the operation of the system. However, if one additional page of RAM were allocated to disk cache, then the entire database could be stored in the disk cache portion of RAM. This would allow the database to do repeated searches much faster because it would not have to access the secondary storage device.

In most traditional computer architectures, the amount of physical memory set aside for disk cache is fixed, and, therefore, they do not allow for the allocation of physical memory to be dynamically changed.

Some prior operating systems do have mechanisms for dynamically moving memory from disk cache to virtual memory. The "WINDOWS NT" operating system, developed by Microsoft Corporation, dynamically adjusts limits on the size of disk cache and virtual memory based upon the present memory requirements of computer operations. In particular, these systems link all memory, whether in the disk cache or in the virtual memory, into a single pool and track the most recently used and least recently used data sets for computer operations. Least recently used data is always used to make room for more frequently used data within the fixed amount of allocated RAM for disk cache or virtual memory.

For example, if a program is accessing virtual memory more frequently and disk cache less frequently, then the virtual memory will tend to grow because the disk cache pages will be the least recently used. The opposite is also true. That is, if a program is accessing disk cache more frequently than virtual memory, then the disk cache will grow because the virtual memory pages are the least recently used. Thus, the size of the disk cache or virtual memory is adjusted to fit the requirements of the most recently used data.

These prior systems change the allocation of RAM based merely on the level of activity in virtual memory or the disk cache, i.e., based upon all accesses to virtual memory or the disk cache. The prior art systems do not change the allocation of the RAM with respect to the working set, i.e., based upon accesses to the least recently used pages of virtual memory or the most recently discarded pages from disk cache. Consequently, there are certain situations in which these systems will change the allocation of physical memory between virtual memory and disk cache even though doing so does not improve the performance level of the computer system, i.e., it does not reduce the number of real disk accesses.

For example, the working set may be larger than the available RAM set aside for use as disk cache or virtual memory. Despite this large working set size, these prior art systems will attempt to expand memory and to accommodate the large working set size by discarding least frequently used data in favor of more frequently used data. This will lead to a cycle of discarding from RAM data classified as "least frequently used" that may be useful for the operating system or the user's present program. This defeats the purpose of using physical memory to obtain faster data access times and leads to the inefficient use of a scarce memory resource.

Consequently, there is a need for a computer system that dynamically changes the allocation of its physical memory only when doing so will improve the performance of the system.

Furthermore, there is a need for a computer system that detects when changing the allocation of its physical memory will cause a net reduction in the number of real disk accesses, and in response to such a detection, actually changes the allocation of physical memory.

SUMMARY OF THE INVENTION

As will be seen, the present invention satisfies the foregoing needs. Briefly described, the present invention provides an improved method for dynamically changing the allocation of RAM between virtual memory and disk cache. In a computer system having a processing unit, a primary memory space (RAM) and a secondary memory space (disk), the primary memory space being allocated between a virtual memory portion and a disk cache portion, the method begins by measuring a performance level of the computer system relating to the number of times that the processing unit accesses the secondary memory space in a predetermined time period.

Next, it is determined whether an adjustment to the allocation of the primary memory space would improve the performance level of the computer system. The performance level of the computer system is improved by reducing the number of times that the secondary memory space is accessed by the processing unit. If an adjustment to the allocation of the primary memory space would improve the performance level of the computer system, then the adjustment to the allocation of the primary memory space is made by increasing the portion allocated to either virtual memory or disk cache, and decreasing the portion allocated to the other.

According to one aspect of the invention, it is determined whether an adjustment to the allocation of the primary memory space would improve the performance level of the computer system by making a plurality of measurements relating to selected portions of the primary memory space. The selected portions of the primary memory space include: a first subset of recently discarded pages of the disk cache portion; a second subset of least recently used pages of the disk cache portion; a third subset of recently discarded pages of the virtual memory portion; and a fourth subset of least recently used pages of the virtual memory portion.

The plurality of measurements which are made with respect to the predetermined time period include: a first measurement of the number of times that the first subset is accessed by the processing unit; a second measurement of the number of times that the processing unit system accesses the second subset; a third measurement of the number of times that the third subset is accessed by the processing unit; and a fourth measurement of the number of times that the processing unit accesses the fourth subset.

In general, the first measurement is representative of the number of accesses to the secondary memory that would have been eliminated if the size of the disk cache had been increased by the number of pages in the subset measured. The second measurement is representative of the number of additional accesses to the secondary memory that would have been required if the disk cache had been reduced by the number of pages in the subset measured. The third measurement is representative of the number of accesses to the secondary memory that would have been eliminated if the size of virtual memory had been increased by the number of pages in the subset measured. The fourth measurement is representative of the number of additional accesses to the secondary memory that would have been required if virtual memory were decreased by the number of pages in the subset measured.

If the first measurement is greater than the fourth measurement, then increasing the portion of RAM allocated to disk cache would reduce the number of actual accesses to the secondary memory. If, however, the third measurement is greater than the second measurement, then increasing the portion of RAM allocated to virtual memory would decrease the number of paging operations, thereby reducing the number of accesses to the secondary memory.

To resolve the conflicting needs of disk cache and virtual memory, the differences between the two sets of measurements are compared. If the difference between the first measurement and the fourth measurement is greater than the difference between the second measurement and the third measurement, then the size of the disk cache is increased, since it would cause a net reduction in the number of accesses to the secondary memory. If, on the other hand, the difference between the first measurement and the fourth measurement is less than the difference between the second measurement and the third measurement, then the size of virtual memory is increased, since it would cause a net reduction in the number of accesses to the secondary memory.

If the difference between the first measurement and the fourth measurement is equal to the difference between the second measurement and the third measurement, then changing the allocation of RAM would not cause a net reduction in the number of accesses to the secondary memory. Therefore, in this case the allocation of the physical memory space is not adjusted.

According to another aspect of the invention, an improved computer system is provided for dynamically changing the allocation of RAM between virtual memory and disk cache. The computer system comprises a processing unit, a primary memory space (RAM), a secondary memory space (disk) and a memory management unit (MMU). The primary memory space comprises physical memory, or RAM, and is allocated between virtual memory and disk cache. As configured, the computer system is operative to perform the previously described method.

DETAILED DESCRIPTION OF THE PREFERRED EMBODIMENTS

Referring now to the drawing figures, in which like numerals indicate like elements or steps throughout the several views, the preferred embodiments of the present invention will be described. In general, the present invention comprises a computer system which provides an improved method for dynamically changing the allocation of RAM between virtual memory and disk cache. In contrast to earlier systems, the present invention changes the allocation of RAM only when doing so is likely to improve the performance level of the computer system. More specifically, the present invention determines whether an adjustment to the allocation of RAM will improve the performance level of the computer system by causing a net reduction in the number of accesses to the secondary memory (disk). If an adjustment to the allocation of RAM will improve the performance level of the system, then the present invention adjusts the allocation of RAM.

Figure 1:
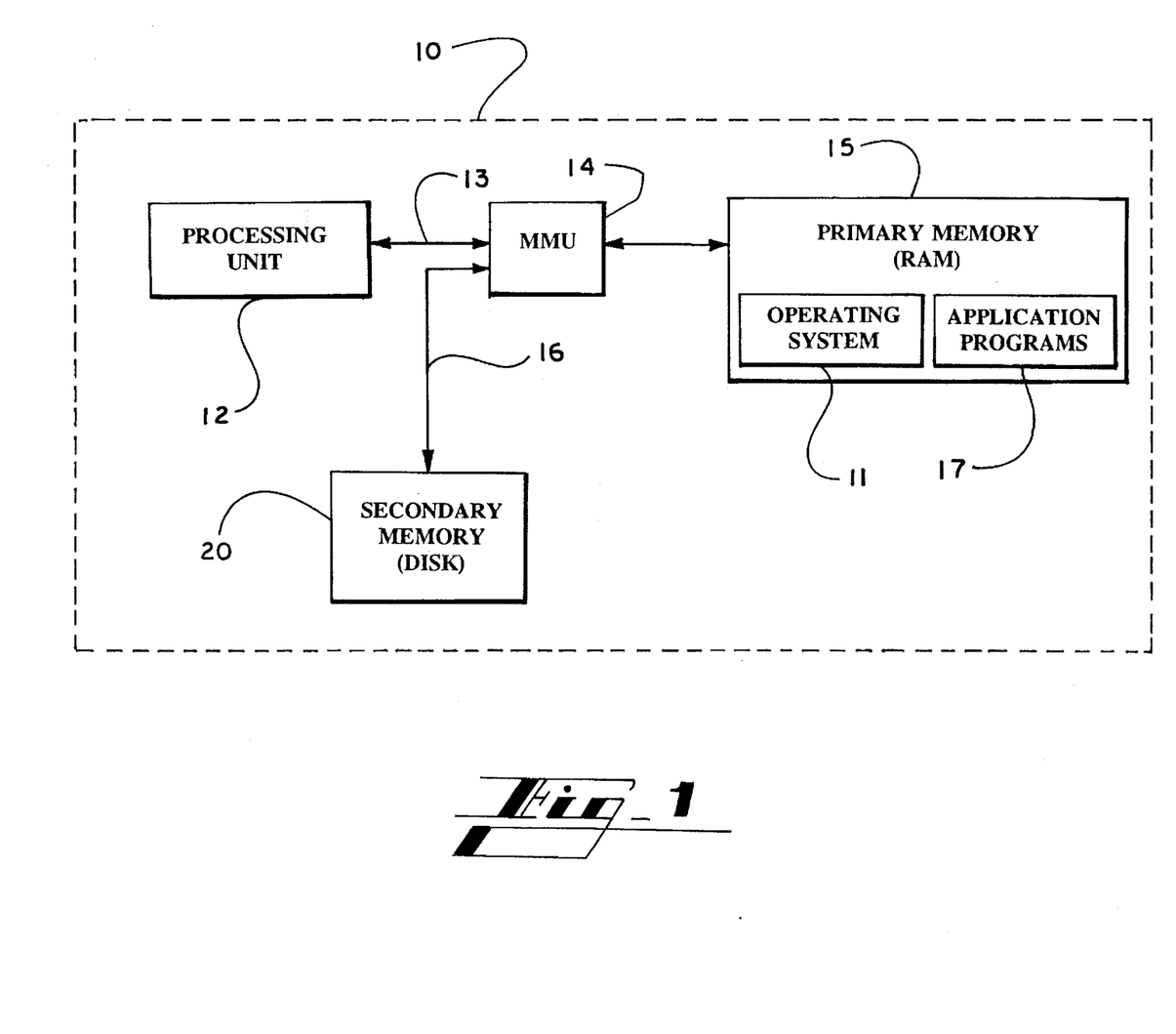
FIG. 1 is a general block diagram of an improved computer system constructed according to the present invention.

FIG. 1 illustrates a preferred embodiment of a computer system 10 embodying the system in the present invention, and which executes the steps of the methods described herein. The computer system 10 comprises a processing unit 12 which operates to execute an operating system 11 and application programs 17 desired by an operator of the system. The operating system 11 and application programs 17 can be stored within a primary random access memory (RAM) 15, also referred to as "physical memory." The processing unit 12 in the preferred embodiment is a type 80386 or 80486 microcomputer circuit, manufactured by Intel Corporation of Santa Clara, Calif., together with various peripheral support circuits (not shown), which executes application programs written for the IBM PS/2, XT, AT or PC, or other compatible microcomputer systems.

Those familiar with the 80386 and 80486 processors will understand that these processing units 12 are full 32-bit processors, i.e., they can address, operate on, and move up to 32 bits of data at one time. When the 80386 and 80486 processors operate in protected mode, they can, at least in theory, access up to 4 gigabytes of virtual memory. The amount of memory a processor can access is determined by the maximum address value it can store in its internal memory registers or send out to external devices such as memory boards.

The processing unit 12 includes address, dam, and control lines 13 which connect to a memory management unit (MMU) 14. The MMU 14 controls accesses by the processing unit 12 to RAM 15. In addition, the MMU 14 performs an address translation function required in implementing virtual memory, wherein addresses provided by the processing unit 12 are translated into actual physical addresses in the RAM 15. While the MMU 14 is shown in the drawing as a separate hardware device from the processing unit 12, it will be appreciated that the functions of the MMU 14 may also be provided by software stored within the processing unit 12.

The preferred embodiment of FIG. 1 further comprises a communications link 16, which allows the computer system to communicate with other processing units, data storage devices, or other peripherals. In particular, it is contemplated that a secondary memory 20 may be connected to the computer system 10 for mass storage of information. In the preferred embodiment, the secondary memory 20 is a mass data storage device such as a Winchester or "hard" disk, which stores large amounts of information, typically in the megabyte range. It will be understood and appreciated to those skilled in the art that the secondary memory 20 may also comprise other forms of volatile or non-volatile memory storage systems.

Figure 2A:
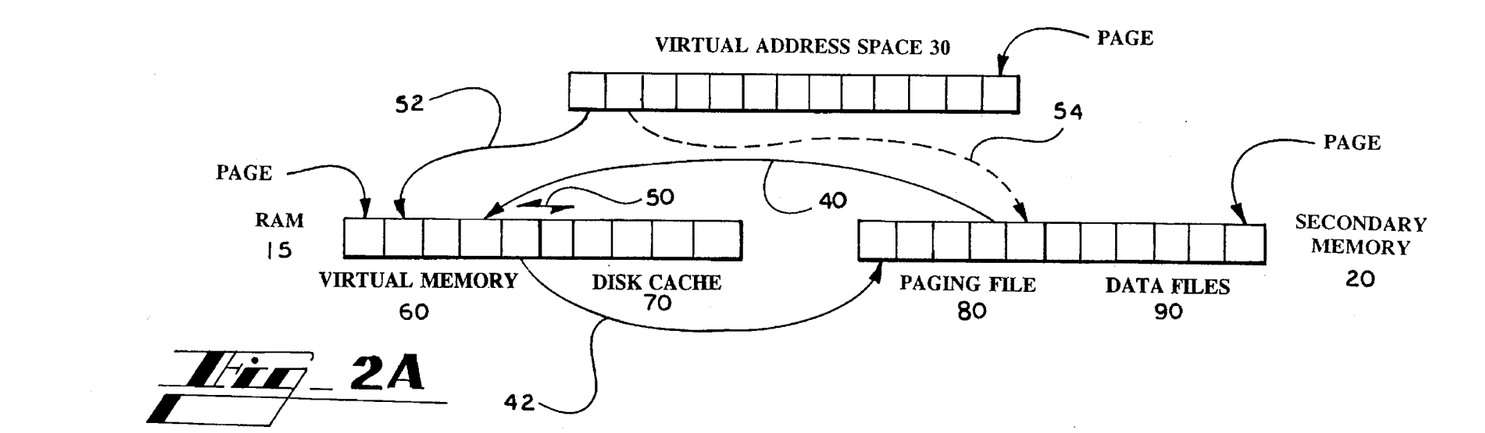
FIGS. 2A–B illustrate the relationship between the virtual memory space and the physical address space and the implementation of virtual memory and disk cache according to the present invention.
Figure 2B:
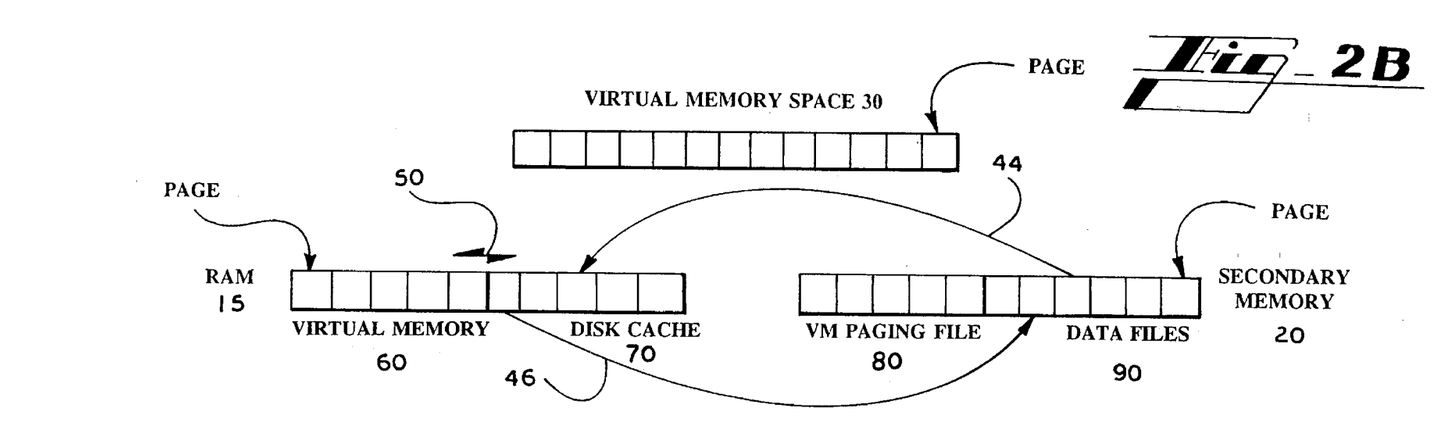

Turning first to the nomenclature of the specification, FIGS. 2A–B illustrate the mapping of virtual addresses in the virtual address space to physical memory addresses, as well as the operation of virtual memory and disk cache in the preferred embodiment. The virtual address space 30 encompasses virtual addresses which are mapped by the MMU 14 into physical memory locations in RAM 15 and the secondary memory 20. Virtual address space 30 is divided into equally sized segments called "pages". A page is a block of memory whose physical address can be changed via mapping hardware. The size of each page is generally fixed and is determined by the particular processing unit 12. However, it will be appreciated that the size of the pages may also vary. In the preferred embodiment, each page is 4 KB in size.

Those skilled in the art will recognize that it is irrelevant whether a particular piece of data is actually stored in RAM 15 or in the secondary memory 20; the application only "sees" the virtual address space 30. Thus, at any time, any individual page in the virtual address space 30 might be mapped to a physical address in RAM 15 or in the secondary memory 20, depending on how recently it has been used. This is indicated in FIG. 2A by lines 52 and 54, respectively. That is, if a page of virtual address space 30 has been recently used, it will likely be stored in RAM 15. On the other hand, if a page of virtual address space 30 has not been recently used, then it will likely be stored in the secondary memory 20. Because data stored in the secondary memory 20 cannot be directly accessed, line 54 is represented as a dotted line in the drawing.

The physical address space in RAM 15 is divided into a finite number of fixed-size pages. A portion of the finite number of pages in RAM 15 is allocated to virtual memory 60, and the remainder of the pages in RAM 15 is allocated for disk cache 70. The initial allocation of RAM 15 between virtual memory 60 and disk cache 70 may be fixed by the operating system or by the user of the computer system. The preferred embodiment is operative to dynamically change the allocation of RAM 15 between virtual memory 60 and disk cache 70 depending on the particular operation being performed. Thus, the boundary between virtual memory 60 and disk cache 70, as indicated by the double arrow 50 in FIGS. 2A–B, is dynamically changed such that as the amount of RAM 15 allocated to one increases, the amount of RAM 15 allocated to the other must necessarily decrease.

The secondary memory 20 is also divided up into pages, a portion of which is set aside for virtual memory. The virtual memory portion of the secondary memory 20 is referred to as the "swap file" or the "paging file" 80. The remaining portion of the secondary memory 20 is used to store data files 90 of varying sizes. In the preferred embodiment, the system sets a default size for the paging file 80 which may be adjusted as required by the operating system 11.

The preferred embodiment of the present invention is operative to run programs prepared for execution on the processing unit 12 by loading pages or segments of those programs into virtual memory 60 on demand. The MMU 14 monitors the addresses provided by the processing unit 12, and determines whether the information requested by the processing unit 12, as manifested by the address placed on the address lines of the processing unit 12, is currently resident in virtual memory 60. Thus, pages or segments of a program to be executed by the processing unit 12 are retrieved from the secondary memory 20 only if the processing unit 12 outputs an address which calls for a page of information which is not currently resident in virtual memory 60.

If the MMU 14 determines that the requested information is not presently resident in virtual memory 60, a "page fault" condition occurs. The determination of a page fault is made by accessing a status entry in a memory map (not shown) contained in the MMU 14, which stores status entries for a plurality of pages of data. The processing unit 12 then corrects the page fault by requesting the non-resident page from the secondary memory 20. When the requested information is provided from the secondary memory 20, it is transferred from the paging file 80 through the MMU 14 and into virtual memory 60, as indicated by the arrow 40 in FIG. 2A. The MMU 14 then provides the addressed data on the data lines of the processing unit 12.

If virtual memory 60 is full, then a subset of data must be written out from RAM 15 back into the paging file 80, as indicated by the arrow 42 in FIG. 2A. In the preferred embodiment, the subset of data that is written back into the paging file 80 is determined by any one of many least recently used (LRU) algorithms which are well known in the art. Those skilled in the art will appreciate, however, that many other mechanisms other than LRU algorithms may also be used for deciding which pages are the next candidates for being written back into the paging file 80, for example, a first in-first out (FIFO) algorithm, which is well known in the art.

Thus, the processing unit 12 operates as if the data were provided directly in response to a memory request as reflected by the outputting of an address bus of the processing unit during an address cycle. In other words, the detection and correction of a page fault condition is completely transparent to and independent of the execution of the program by the processing unit 12.

The MMU 14 is also operative to intercept requests for data stored in data files 90 that are sent from the processing unit 12 to the secondary memory 20. The MMU 14 monitors the addresses provided by the processing unit 12 and determines whether the data requested is currently resident in the disk cache 70. Thus, pages or segments of data requested by the processing unit 12 are retrieved from the secondary memory 20 only if the processing unit 12 outputs an address which calls for a page of data which is not currently resident in disk cache 70.

If the MMU 14 determines that the requested data is at present resident in disk cache 70, then the MMU 14 will supply the data directly to the processing unit 12 without having to access the secondary memory 20. On the other hand, if the requested data is not at present resident in the disk cache 70, then the MMU 14 will retrieve the data from the data files 90, and store a copy of the data in disk cache 70. This is indicated by the arrow 44 in FIG. 2B.

In addition to retrieving the requested data, the MMU 14 may also retrieve additional data from the secondary memory 20. For example, the MMU 14 may retrieve a predetermined amount of data from adjacent clusters on the secondary memory 20, in anticipation that data located in adjacent clusters from the requested data is more likely to be requested in the near future by the program.

If disk cache 70 is full when data is retrieved from the data files 90 as indicated by arrow 44, then the MMU 14 will discard selected data from disk cache 70, as indicated by the arrow 46 in FIG. 2B, in order to create room for the requested data. In the preferred embodiment, the data discarded is the data that has been the "least recently accessed" or the "least recently used", i.e., the data that has been in the disk cache portion of RAM 15 the longest without being used.

Thus, in general, if a particular page of the virtual address space 30 is currently stored in RAM 15, the application will gain immediate access to it. On the other hand, if the page of the virtual address space 30 is currently resident in the secondary memory 20, the MMU 14 will read that data from the secondary memory 20 into its corresponding section of RAM 15. If that section of RAM 15 is currently occupied by some other data, the MMU 14 will have to write that data to the secondary memory 20, or discard that data, in order to create an available address space for the requested data.

Further, the preferred embodiment has been illustrated and described in accordance with a single MMU 14 that is operative to implement both virtual memory and disk cache for the computer system. It will be appreciated that two separate memory modules may also be provided to perform these two functions. It will also be appreciated that the functions of the MMU 14 may be provided by software stored within the processing unit 12. In both of these embodiments, the methods of dynamically adjusting RAM between virtual memory and disk cache are the same as described herein.

The present invention is operative to dynamically adjust the allocation of RAM 15 between virtual memory 60 and disk cache 70. The particular allocation is dependent on the particular operation being performed and whether or not the secondary memory 20 is being heavily accessed.

In contrast to prior systems, the present invention does not actually adjust the allocation of RAM 15 unless and until the system first determines that doing so is likely to improve the "performance level" of the computer system. The "performance level" of the computer system is related to the number of times that the processing unit 12 accesses the secondary memory 20 in a predetermined time period, and therefore is a measure of the processing speed at which the computer system 10 is currently operating. A higher performance level indicates fewer accesses to the secondary memory 20, and thus faster processing time. Conversely, a lower performance level indicates a greater number of accesses to the secondary memory 20, and thus slower processing time. In the preferred embodiment, the allocation of RAM 15 is only adjusted if it is likely to improve the performance level of the computer system 10 by causing a net reduction in the number of accesses to the secondary memory 20.

Figure 3:
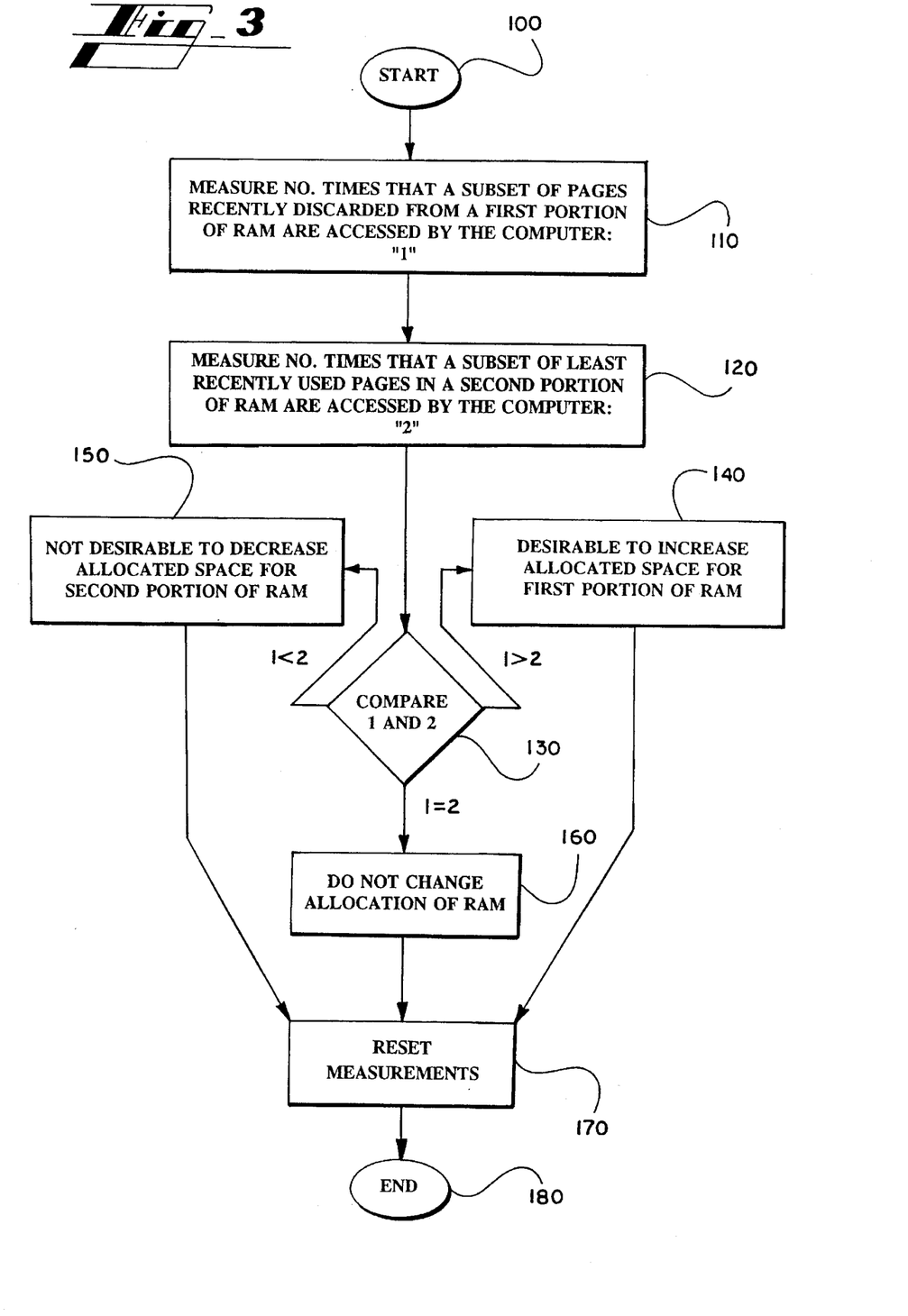
FIG. 3 is a flow chart illustrating general program operation of the processing unit employed in the preferred embodiment.
Figure 4A:
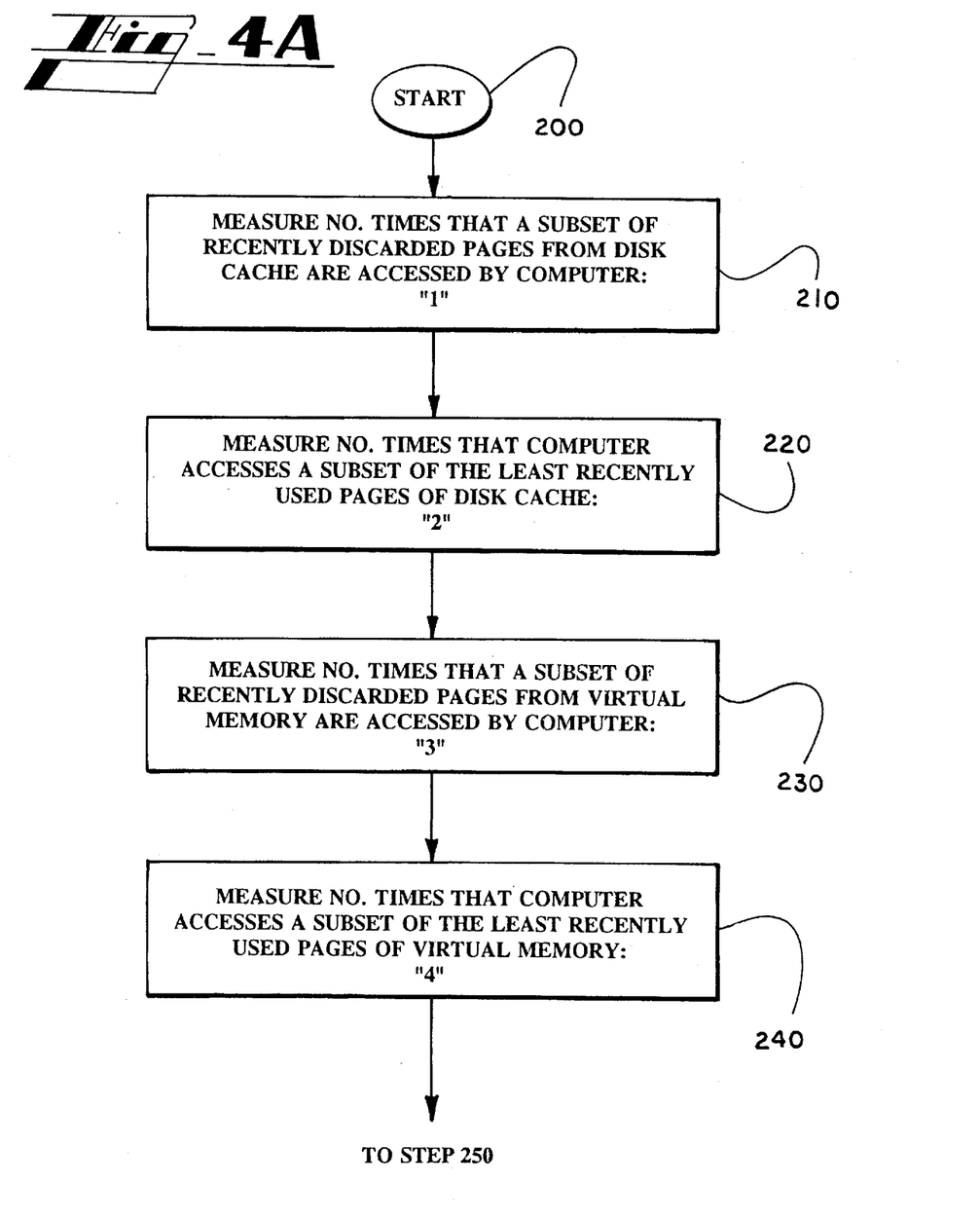
FIGS. 4A–B is a flow chart illustrating detailed program operation of the processing unit employed in the preferred embodiment.
Figure 4B:
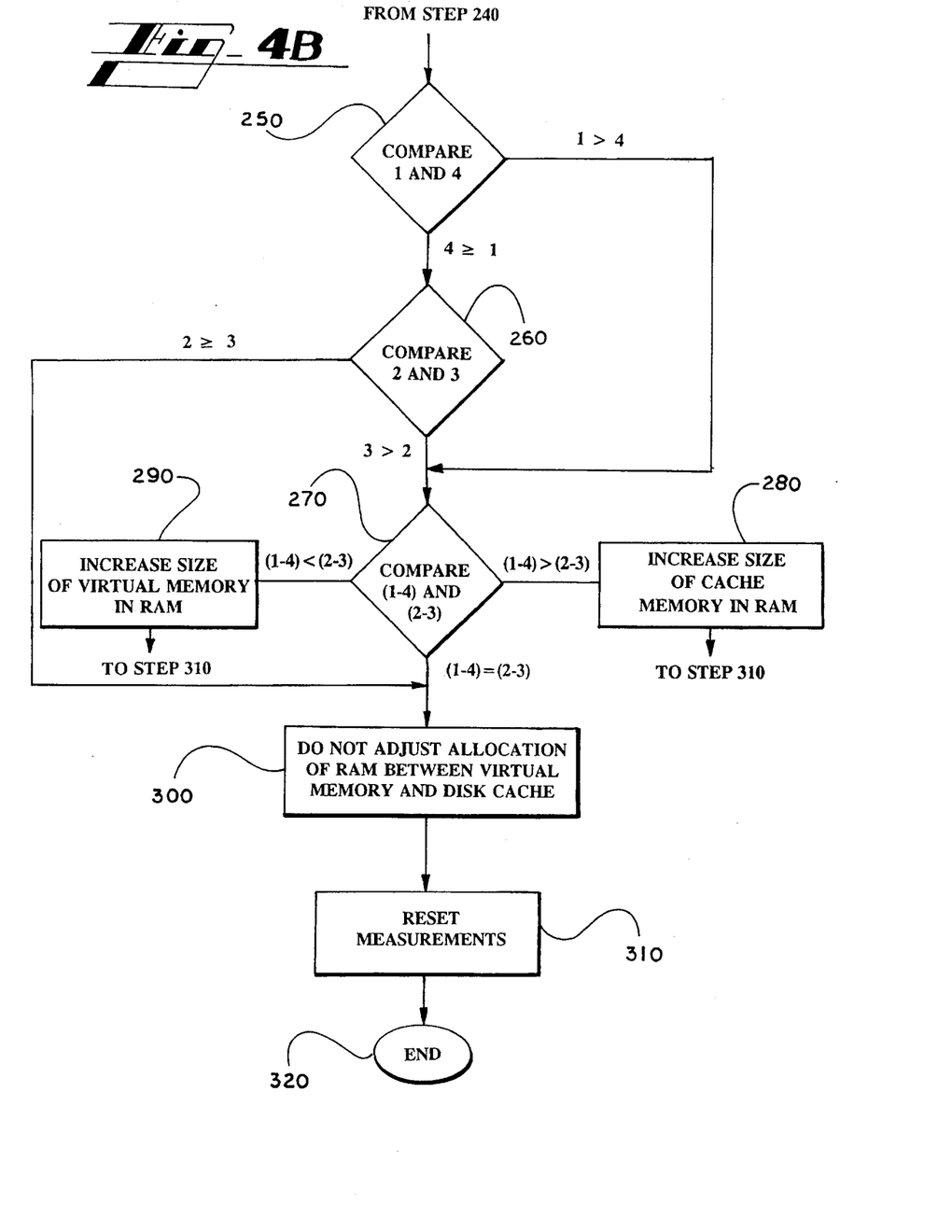

FIGS. 3 and 4 are flow charts illustrating sequences of steps which may be embodied as programs for the processing unit 12. Those skilled in the art will understand and appreciate that the improved computer system 10 disclosed herein may be constructed by circuits comprising digital hardware, or by using a programmed microcomputer as a second processing unit, together with supporting peripheral circuits. It will be understood that the operation disclosed herein is merely illustrative and that the processing unit 12 may include other functional equivalents including digital hardware, firmware, or software, which are capable of performing the described functions and sequences in the computer system 10.

FIG. 3 illustrates a preferred embodiment of the present invention. Referring to FIGS. 2A–B and FIG. 3, the operational flow begins at the START block 100 and is repeated in a predetermined time interval. The competing size requirements of two portions of RAM (virtual memory 60 and disk cache 70) are balanced by maintaining certain statistics about the number of accesses to the two portions. At step 110, the number of times that a subset of pages recently discarded from virtual memory 60 are accessed again by the computer within the predetermined time interval are measured to provide a first measurement. It will be appreciated that if the first measurement is large, then a larger allocated space of RAM to virtual memory 60 would have allowed such data to be accessed within RAM 15 rather than via the slower secondary memory 20, thereby reducing the number of paging operations.

At step 120, the number of times that a subset of least recently used pages in a disk cache 70 are accessed by the computer are measured to provide a second measurement. Because pages are discarded from disk cache 70 according to a least recently used algorithm, the least recently used pages are the next candidates for getting discarded from RAM 15. Thus, it will be appreciated that a large value for the second measurement is indicative that it is not desirable to reduce the size of the allocated space for disk cache 70.

At step 130, the sizes of the first measurement and the second measurement are compared. If the size of the first measurement is greater than the size of the second measurement, then the indication that virtual memory 60 should be expanded is greater than the indication that the size of disk cache 70 should not be reduced. Therefore, at step 140, it is desirable to allocate a larger portion of RAM to virtual memory 60. The process then proceeds to step 170.

If, on the other hand, the size of the second measurement is greater than the size of the first measurement, then the indication that the size of disk cache 70 should not be reduced is greater than the indication that the size of virtual memory 60 should be increased. Therefore, at step 150, it is not desirable to reduce the size of the disk cache 70. The process then proceeds to step 170.

If the size of the first measurement is equal to the size of the second measurement, then the indication that it is desirable to increase the size of virtual memory 60 is equally balanced by the indication that the size of disk cache 70 should not be reduced. Therefore, changing the allocation of RAM 15 in this case would not cause a net reduction in the number of accesses to the secondary memory 20, and thus would not improve the performance of the computer system. Accordingly, at step 160, the allocation of RAM 15 is not adjusted.

At step 170, the first and second measurements are reset to zero, and the process ends at step 180. FIGS. 4A–B is a flow chart illustrating an alternative preferred embodiment of the present invention. It will be appreciated that the sequence of steps shown in FIGS. 4A–B may be embodied as a program for the processing unit 12.

Referring to FIGS. 2A–B and FIGS. 4A–B, the operational flow begins at the START block 200 and is repeated at a predetermined time interval. The competing size requirements of both virtual memory 60 and disk cache 70 are balanced by maintaining certain statistics about virtual memory 60 and disk cache 70 accesses. At step 210, the number of times that a subset of recently discarded pages of disk cache 70 are accessed by the computer are measured to provide a first measurement. The first measurement is representative of the number of accesses to the secondary memory 20 that would have been eliminated if the size of the disk cache 70 had been increased by the number of pages in the subset measured. Thus, a large value for the first measurement is an indication that the disk cache 70 is not large enough to hold its working set.

At step 220, the number of times that the computer accesses a subset of the least recently used pages of disk cache 70 are measured to provide a second measurement. Because the subset of pages that are to be discarded from disk cache 70 is determined by a least recently used algorithm, the least recently used pages are the next candidates for getting discarded from RAM 15. Therefore, the second measurement is an indication that if the disk cache 70 had fewer pages in it, then these least recently used pages would have been discarded already. Thus the secondary memory 20 would have to be accessed in order to retrieve these least recently used pages, thereby slowing down the operation of the system. Therefore, the higher the number of the second measurement, the greater the indication that the size of the disk cache 70 should not be decreased.

At step 230, the number of times that a subset of recently discarded pages of virtual memory 60 are accessed by the computer are measured to provide a third measurement. The third measurement is representative of the number of accesses to the paging file 80 on the secondary memory 20 that would have been eliminated if the size of virtual memory 60 had been increased by the number of pages in the subset measured. Thus, a large value for the third measurement is an indication that the size of the virtual memory 60 is not large enough to hold its working set.

At step 240, the number of times that the computer accesses a subset of the least recently used pages of virtual memory 60 are measured to provide a fourth measurement. The least recently used pages of virtual memory 60 are the next candidates for getting swapped out to the paging file 80 on the secondary memory 20. The fourth measurement is representative of the number of paging operations that the system would have had to perform if the size of virtual memory 60 were decreased by the number of pages in the subset measured. Thus, a large value for the fourth measurement is an indication that the size of virtual memory 60 was just large enough to hold its working set.

Thus, in contrast to the preferred embodiment shown and described in connection with FIG. 3, the preferred embodiment shown in FIGS. 4A–B maintains statistics about the number of accesses to the least recently used pages and the most recently discarded pages for both virtual memory and disk cache.

At step 250, the first measurement and the fourth measurement are compared in order to determine whether it is desirable to transfer pages from virtual memory 60 to disk cache 70. It will be appreciated that the first measurement minus the fourth measurement represents the number of accesses to the secondary memory 20 that would be eliminated by expanding the size of disk cache 70 by the number of pages in the subset measured. If the first measurement is greater than the fourth measurement, then increasing the portion of RAM 15 allocated to the disk cache 70 by the number of pages in the subset measured would reduce the number of actual accesses to the secondary memory 20 because it would increase the cache "hit rate" by more than it would increase the amount of paging. The disk cache "hit rate" is the probability that the data to be accessed will reside in RAM 15 rather than the secondary memory 20. Therefore, in this case, it is desirable to expand the size of disk cache 70, and the operation proceeds to step 270.

If, on the other hand, the first measurement is not greater then the fourth measurement, increasing the portion of RAM 15 allocated to disk cache 70 would not increase the disk cache hit rate by more than it would increase the amount of paging. Therefore, in this case, expansion of disk cache 70 is not desirable, and the operation proceeds to step 260.

At step 260, the second measurement and the third measurement are compared in order to determine whether it is desirable to transfer pages from disk cache 70 to virtual memory 60. It will be appreciated that the third measurement minus the second measurement represents the number of accesses to the secondary memory 20 that would be saved by expanding the size of virtual memory 60 by the number of pages in the subset measured. If the third measurement is greater than the second measurement, then the system should transfer RAM 15 from disk cache 70 to virtual memory 60, since it would decrease the amount of paging more than it would increase the disk cache "miss rate." The disk cache "miss rate" is the probability that data to be accessed will reside in the slower secondary memory 20 rather than in RAM 15. Therefore, in this case it is desirable to expand the size of virtual memory 60, and the operation proceeds to step 270.

On the other hand, if the third measurement is not greater than the second measurement, transferring RAM 15 from the disk cache 70 to virtual memory 60 would not decrease the amount of paging by more than it would increase the disk cache miss rate. Therefore, in this case, expansion of virtual memory 60 is not desirable, and the operation proceeds to step 300.

If at step 300, it has been determined that it is not desirable to expand either virtual memory 60 or disk cache 70, then the allocation of RAM 15 will not be adjusted.

Assuming that it is desirable to expand either disk cache 70 or virtual memory 60, then the next step is to determine whether it will improve the performance level of the computer to actually expand the portion of RAM 15 allocated to one of those portions. It will be appreciated that there may be instances when it may be desirable to increase the size of both virtual memory 60 and disk cache 70 (e.g., if the first measurement is greater than the fourth measurement and the third measurement is greater than the second measurement). To resolve the conflicting needs of virtual memory 60 and disk cache 70, at step 270, the difference between the two sets of measurements is compared.

If the difference between the first and fourth measurements is greater than the difference between the second and third measurements, then the indication that it is desirable to expand the size of disk cache 70 is greater than the indication that it is desirable to expand the size of virtual memory 60. Therefore, at step 280 the amount of RAM 15 that is allocated to disk cache 70 is expanded by the number of pages in the subset measured. It will be appreciated that transferring pages from virtual memory 60 to disk cache 70 in this case will cause a net reduction in the number of accesses to the secondary memory 20, thereby improving the performance level of the computer. The process then proceeds to step 310.

On the other hand, if the difference between the second and third measurements is greater than the difference between the first and fourth measurements, then the indication that it is desirable to increase the size of virtual memory 60 is greater than the indication that it is desirable to increase the size of disk cache 70. Therefore, at step 290 the amount of RAM 15 that is allocated to virtual memory 60 is expanded by the number of pages in the subset measured. It will be appreciated that transferring pages from disk cache 70 to virtual memory 60 in this case will cause a net reduction in the number of accesses to the secondary memory, thereby improving the performance level of the computer. The process then proceeds to step 310.

If the difference between the first and fourth measurements is equal to the difference between the second and third measurements, then at step 300 neither of the two memories is expanded. Because the differences between the two sets of measurements are equal, changing the allocation of RAM 15 in this case would not cause a net reduction in the number of accesses to the secondary memory 20, and thus would not improve the performance of the system. Accordingly, the allocation of RAM 15 is not adjusted.

At step 310, the measurements are reset to zero, and the process ends at step 320.

While the subset of pages from which the measurements are taken may be any size, the optimal subset of pages in the preferred embodiments is approximately 26 pages. It has been determined that a subset of 26 pages supports fast computer programs, while providing optimal results for the invention. However, those skilled in the art will understand and appreciate that the subset of pages may be any other size as well. Thus, the preferred embodiments contemplate that a table of the 26 most recently discarded pages from disk cache 70 and virtual memory 60 and the 26 least recently used pages in disk cache 70 and virtual memory 60 will be maintained and continuously updated. In this manner, it will be possible to easily determine whether a particular page that is accessed is one that has been recently discarded from disk cache 70 or virtual memory 60 or is one of the least recently used pages of disk cache 70 or virtual memory 60.

In addition, in the preferred embodiments, the statistics relating to virtual memory 60 and disk cache 70 accesses are analyzed in one second intervals. The present invention need not be so limited, however, and those skilled in the art will understand and appreciate that these measurements may be made in any other intervals. New statistics are calculated for each interval.

Furthermore, while the preferred embodiments have been illustrated and described in accordance with a specific sequence of steps, it will be appreciated that the present invention need not be limited to any particular sequence. In particular, the present invention is equally operable by first determining whether it is desirable to expand the size of virtual memory 60 before determining whether it is desirable to expand the size of disk cache 70.

In view of the foregoing, it will be understood that the present invention provides an improved computer system that dynamically changes the allocation of RAM between virtual memory and disk cache. The computer system is operative to determine whether an adjustment to the allocation of RAM is likely to improve the performance level of the computer system by reducing the number of accesses to the secondary memory. If the computer system determines that an adjustment is likely to improve the performance level, then the computer system adjusts the allocation of RAM.

It will also be appreciated that the methods described herein could be used in other embodiments involving multiple systems competing for RAM, not just virtual memory and disk cache. Some operating systems, for example, have particular amounts of RAM set aside for the different programs that are running, and the methods described herein could be used to dynamically allocate RAM between these multiple programs.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing discussion.

What is claimed is:

1. A computer system, comprising:

a processing unit;

a primary memory space coupled to said processing unit, said primary memory space including a first portion allocated for virtual memory and a second portion allocated for disk cache, said virtual memory including a first set of least recently used pages of information and said disk cache including a second set of least recently used pages of information;

a secondary memory space coupled to said processing unit, said secondary memory space including a plurality of paging files having a set of pages recently discarded from said virtual memory, said secondary memory space further including a plurality of data files having a set of pages recently discarded from said disk cache;

said processing unit responsive to computer-implemented instructions to dynamically adjust the allocation of said primary memory space between said virtual memory and said disk cache by conducting the steps of:

(i) measuring the number of times that said processing unit accesses a subset of the pages recently discarded from said virtual memory within a predetermined time interval;

(ii) measuring the number of times that said processing unit accesses a subset of the least recently used pages in said disk cache within said predetermined time interval;

(iii) if the number of times that said processing unit accesses the subset of the pages recently discarded from said virtual memory within said predetermined time interval is not equal to the number of times that said processing unit accesses the subset of the least recently used pages in said disk cache within said predetermined time interval, then adjusting the allocation of said primary memory space.

2. The computer system of claim 1, wherein said adjusting step further comprises:

if the number of times that said processing unit accesses the subset of the pages recently discarded from said virtual memory within said predetermined time interval is greater than the number of times that said processing unit accesses the subset of the least recently used pages in said disk cache within said predetermined time interval, then increasing the size of said virtual memory by a predetermined amount and decreasing the size of said disk cache by said predetermined amount.

3. The computer system of claim 2, wherein said predetermined amount is equal to the number of pages in the subset of the pages recently discarded from said virtual memory.

4. The computer system of claim 1, wherein said adjusting step further comprises:

if the number of times that said processing unit accesses the subset of the pages recently discarded from said virtual memory within said predetermined time interval is less than the number of times that said processing unit accesses the subset of the least recently used pages in said disk cache within said predetermined time interval, then increasing the size of said disk cache by a predetermined amount and decreasing the size of said virtual memory by said predetermined amount.

5. The computer system of claim 4, wherein said predetermined amount is equal to the number of pages in the subset of the least recently used pages in said disk cache.

6. The computer system of claim 5, wherein the number of pages in the subset of the pages recently discarded from said virtual memory is equal to the number of pages in the subset of the least recently used pages in said disk cache.

7. The computer system of claim 6, wherein the number of pages in the subset of the pages recently discarded from virtual memory is approximately 26 pages.

8. The computer system of claim 1, wherein said predetermined time interval is approximately 1 second.

9. A computer system, comprising:

a processing unit;

a primary memory space coupled to said processing unit, said primary memory space including a first portion allocated for virtual memory and a second portion allocated for disk cache, said virtual memory including a first set of least recently used pages of information and said disk cache including a second set of least recently used pages of information;

a secondary memory space coupled to said processing unit, said secondary memory space including a plurality of paging files having a set of pages recently discarded from said virtual memory, said secondary memory space further including a plurality of data files having a set of pages recently discarded from said disk cache;

said processing unit responsive to computer-implemented instructions to dynamically adjust the allocation of said primary memory space between said virtual memory and said disk cache by conducting the steps of:

(i) measuring the number of times that said processing unit accesses a subset of the pages recently discarded from said disk cache within a predetermined time interval;

(ii) measuring the number of times that said processing unit accesses a subset of the least recently used pages in said virtual memory within said predetermined time interval;

(iii) if the number of times that said processing unit accesses the subset of the pages recently discarded from said disk cache within said predetermined time interval is not equal to the number of times that said processing unit accesses the subset of the least recently used pages in said virtual memory within said predetermined time interval, then adjusting the allocation of said primary memory space.

10. The computer system of claim 9, wherein said adjusting step further comprises:

if the number of times that said processing unit accesses the subset of the pages recently discarded from said disk cache within said predetermined time interval is greater than the number of times that said processing unit accesses the subset of the least recently used pages in said virtual memory within said predetermined time interval, then increasing the size of said disk cache by a predetermined amount and decreasing the size of said virtual memory by said predetermined amount.

11. The computer system of claim 9, wherein said adjusting step further comprises:

if the number of times that said processing unit accesses the subset of the pages recently discarded from said disk cache within said predetermined time interval is less than the number of times that said processing unit accesses the subset of the least recently used pages in said virtual memory within said predetermined time interval, then increasing the size of said virtual memory by a predetermined amount and decreasing the size of said disk cache by said predetermined amount.

12. In a computer system having a processing unit, a primary memory space and a secondary memory space, said primary memory space being allocated between virtual memory and disk cache, said virtual memory including a first set of least recently used pages of information and said disk cache including a second set of least recently used pages of information, said secondary memory space including a plurality of paging files having a set of pages recently discarded from said virtual memory, said secondary memory space further including a plurality of data files having a set of pages recently discarded from said disk cache, a method of dynamically adjusting the allocation of said primary memory space between said virtual memory and said disk cache, said method comprising the steps of:

measuring the number of times that a subset of the pages recently discarded from said disk cache is accessed within a predetermined time interval to provide a first measurement;

measuring the number of times that a subset of the least recently used pages in said disk cache is accessed within said predetermined time interval to provide a second measurement;

measuring the number of times that a subset of the pages recently discarded from said virtual memory is accessed within said predetermined time interval to provide a third measurement;

measuring the number of times that a subset of the least recently used pages in said virtual memory is accessed within said predetermined time interval to provide a fourth measurement;

if the difference between the first measurement and the fourth measurement does not equal the difference between the second measurement and the third measurement, then adjusting the allocation of said primary memory space.

13. The method of claim 12, wherein said adjusting step further comprises the step of:

if the difference between the first measurement and the fourth measurement is greater than the difference between the second measurement and the third measurement, then increasing the size of said disk cache and decreasing the size of said virtual memory.

14. The method of claim 12, wherein said adjusting step further comprises the step of:

if the difference between the first measurement and the fourth measurement is less than the difference between the second measurement and the third measurement, then increasing the size of said virtual memory and decreasing the size of said disk cache.

15. In a computer system having a processing unit, a primary memory space and a secondary memory space, said primary memory space being allocated between virtual memory and disk cache, a method of dynamically adjusting the allocation of said primary memory space between virtual memory and disk cache, said method comprising the steps of:

(A) measuring a performance level of the computer system;

(B) determining whether an adjustment to the allocation of said primary memory space would improve the performance level of the computer system by:
  (B1) measuring the number of times that a subset of pages recently discarded from the disk cache is accessed within a predetermined time interval to provide a first measurement;
  (B2) measuring the number of times that a subset of least recently used pages in the disk cache is accessed within said predetermined time interval to provide a second measurement;
  (B3) measuring the number of times that a subset of pages recently discarded from the virtual memory is accessed within said predetermined time interval to provide a third measurement; and
  (B4) measuring the number of times that a subset of least recently used pages in the virtual memory is accessed within said predetermined time interval to provide a fourth measurement; and
(C) if said first measurement is greater than said fourth measurement, then:
  (C1) if the difference between said first measurement and said fourth measurement is greater than the difference between said second measurement and said third measurement, then increasing the size of the disk cache; and
  (C2) if the difference between said first measurement and said fourth measurement is less than the difference between said second measurement and said third measurement, then increasing the size of the virtual memory.

16. In a computer system having a processing unit, a primary memory space and a secondary memory space, said primary memory space being allocated between virtual memory and disk cache, a method of dynamically adjusting the allocation of said primary memory space between virtual memory and disk cache, said method comprising the steps of:

(A) measuring a performance level of the computer system;
(B) determining whether an adjustment to the allocation of said primary memory space would improve the performance level of the computer system by:
  (B1) measuring the number of times that a subset of pages recently discarded from the disk cache is accessed within a predetermined time interval to provide a first measurement;
  (B2) measuring the number of times that a subset of least recently used pages in the disk cache is accessed within said predetermined time interval to provide a second measurement;
  (B3) measuring the number of times that a subset of pages recently discarded from the virtual memory is accessed within said predetermined time interval to provide a third measurement; and
  (B4) measuring the number of times that a subset of least recently used pages in the virtual memory is accessed within said predetermined time interval to provide a fourth measurement; and
(C) if said third measurement is greater than said second measurement, then:
  (C1) if the difference between said first measurement and said fourth measurement is greater than the difference between said second measurement and said third measurement, then increasing the size of the disk cache; and
  (C2) if the difference between said first measurement and said fourth measurement is less than the difference between said second measurement and said third measurement, then increasing the size of the virtual memory.

17. A primary memory storage device for a computer program, said primary memory storage device being allocated between virtual memory and disk cache, said virtual memory including a first set of least recently used pages of information and said disk cache including a second set of least recently used pages of information, said primary memory storage device storing a computer program that provides a method of dynamically adjusting the allocation of said primary memory storage device between said virtual memory and said disk cache, said method comprising the steps of:

measuring the number of times that a subset of pages recently discarded from said disk cache is accessed within a predetermined time interval to provide a first measurement;

measuring the number of times that a subset of the least recently used pages in said disk cache is accessed within said predetermined time interval to provide a second measurement;

measuring the number Of times that a subset of pages recently discarded from said virtual memory is accessed within said predetermined time interval to provide a third measurement;

measuring the number of times that a subset of the least recently used pages in said virtual memory is accessed within said predetermined time interval to provide a fourth measurement;

if the difference between the first measurement and the fourth measurement does not equal the difference between the second measurement and the third measurement, then adjusting the allocation of said primary memory storage device.

18. The primary memory storage device of claim 17, wherein said adjusting step of said method further comprises the step of:

if the difference between the first measurement and the fourth measurement is greater than the difference between the second measurement and the third measurement, then increasing the size of said disk cache and decreasing the size of said virtual memory.

19. The primary memory storage device of claim 17, wherein said adjusting step of said method further comprises the step of:

if the difference between the first measurement and the fourth measurement is less than the difference between the second measurement and the third measurement, then increasing the size of said virtual memory and decreasing the size of said disk cache.

* * * * *